United States Patent [19]

Baker et al.

[11] Patent Number: 5,535,198
[45] Date of Patent: Jul. 9, 1996

[54] ISDN BASIC RATE INTERFACE CENTRAL OFFICE STATION TERMINAL EMULATOR FOR CUSTOMER PREMISES EQUIPMENT

[75] Inventors: Albert D. Baker, Lincroft; Heribert J. Blach, Matawan; James Chen, Edison; Ellen L. Krischer, Teaneck; Maria Pashos, Freehold; Nancy Radics, Matawan; Lee A. Vallone, Locust, all of N.J.

[73] Assignee: AT&T Corp., Murray Hill, N.J.

[21] Appl. No.: 253,469

[22] Filed: Jun. 3, 1994

[51] Int. Cl.⁶ ................................................ H04J 3/12
[52] U.S. Cl. .......................................... 370/60; 370/110.1
[58] Field of Search ................. 370/60, 94.1, 58.1–58.3, 370/110.1, 24, 79, 62, 76; 375/10, 13; 379/157, 158, 202, 203, 201, 93, 94, 96

[56] References Cited

U.S. PATENT DOCUMENTS

| 5,134,611 | 7/1992 | Steinker et al. | 370/110.1 |
| 5,204,860 | 4/1993 | Sparks | 370/110.1 |
| 5,291,549 | 3/1994 | Izumi | 379/213 |

OTHER PUBLICATIONS

ITU-TI.411 Standard, dated Mar. 1993, entitled "ISDN User–Network Interfaces–Reference Configurations".
American National Standard for Telecommunications (ANSI) T1.601–1992 entitled "Integrated Services Digital Network (ISDN) Base Access Interface for Use on Metallic Loops for Application on the Network Side of the NT (Layer 1 Specification)" approved Feb. 21, 1992 by ANSI, Inc.
Q.932 Protocol COM XI–R 239–E, Study Group XI–Report R 239 dated Jun., 1992, entitled "Generic Procedures for the Control of ISDN Supplementary Services".
I.430 COM XVIII–R 119–E (Study Group XVIII–Report R 119) dated Jul., 1992, entitled "Recommendations of the I.430–Series Submitted for Approval at the Xth CCITT Plenar Assembly".
Revised Recommendation Q.921 COM XI–R 205–E (Study Group XI–Report R 205) dated Jun. 1992 entitled "ISDN User–Network Interface–Data Link Layer Specification".
Study Group XI–Report R 238–E May 1992, Recommendation Q.931 entitled "ISDN User–Network Interface Layer 3 Specification for Basic Call Control".

*Primary Examiner*—Benedict V. Safourek
*Assistant Examiner*—Ajit Patel
*Attorney, Agent, or Firm*—Thomas Stafford

[57] ABSTRACT

Full channel service is obtained over a modified ISDN BRI interface by emulating at least one central office (CO) station terminal which provides access to a voice channel over a single DSL for user station terminals whether or not they are ISDN BRI compatible. To this end, an interface is provided for the DSL that emulates an ISDN BRI CO station terminal and acts like a facility to station terminals. More specifically, a plurality of CO station terminals are emulated on a single multi-point passive bus terminating the single DSL. Each of the emulated CO station terminals presents to the CO switching office the appearance of being a CO station terminal. The emulated CO station terminals are configured such that CO features are accessible. Information from the emulated CO station terminals is mapped into existing system structures where such structures are available and compatible with the information from the emulated terminal. New structures have been created so that CO supplementary services can be invoked by the emulated CO station terminals.

6 Claims, 7 Drawing Sheets

FIG. 2A

| STATION TERMINAL ID | STATION TERMINAL BUTTON ATTRIBUTES | BUTTON TREATMENT MAPPING |
|---|---|---|
| SID-1 | SID-1 – BTN-1 – CO BRI CHANNEL ID<br>SID-1 – BTN-2 – CO BRI CHANNEL ID<br>SID-1 – BTN-3 – LOCAL FEATURE ID<br>...<br>SID-1 – BTN-X – CO FEATURE ID | FID-1<br>FID-2<br>LOCAL FEATURE TREATMENT<br>...<br>FID-1/FEATURE BUTTON |
| ... | ... | ... |
| SID-Y | | |

| DSL | EMULATED TERMINAL | DIRECTORY NUMBERS | ADMINISTERED SERVICE PROFILE ID | ENDPOINT ID | FACILITY ID |
|---|---|---|---|---|---|
| DSL 101-1 | 105-1<br>105-1a | DN1<br>DN2 | SPID-1<br>SPID-2 | USID-1/TID-1<br>USID-2/TID-2 | FID-1<br>FID-2 |
| DSL 101-2 | 105-2<br>105-2a | DN3<br>DN4 | SPID-3<br>SPID-4 | USID-3/TID-3<br>USID-4/TID-4 | FID-3<br>FID-4 |
| ... | ... | ... | ... | ... | ... |

200 / 201 / 202 / 203 / 204 / 205

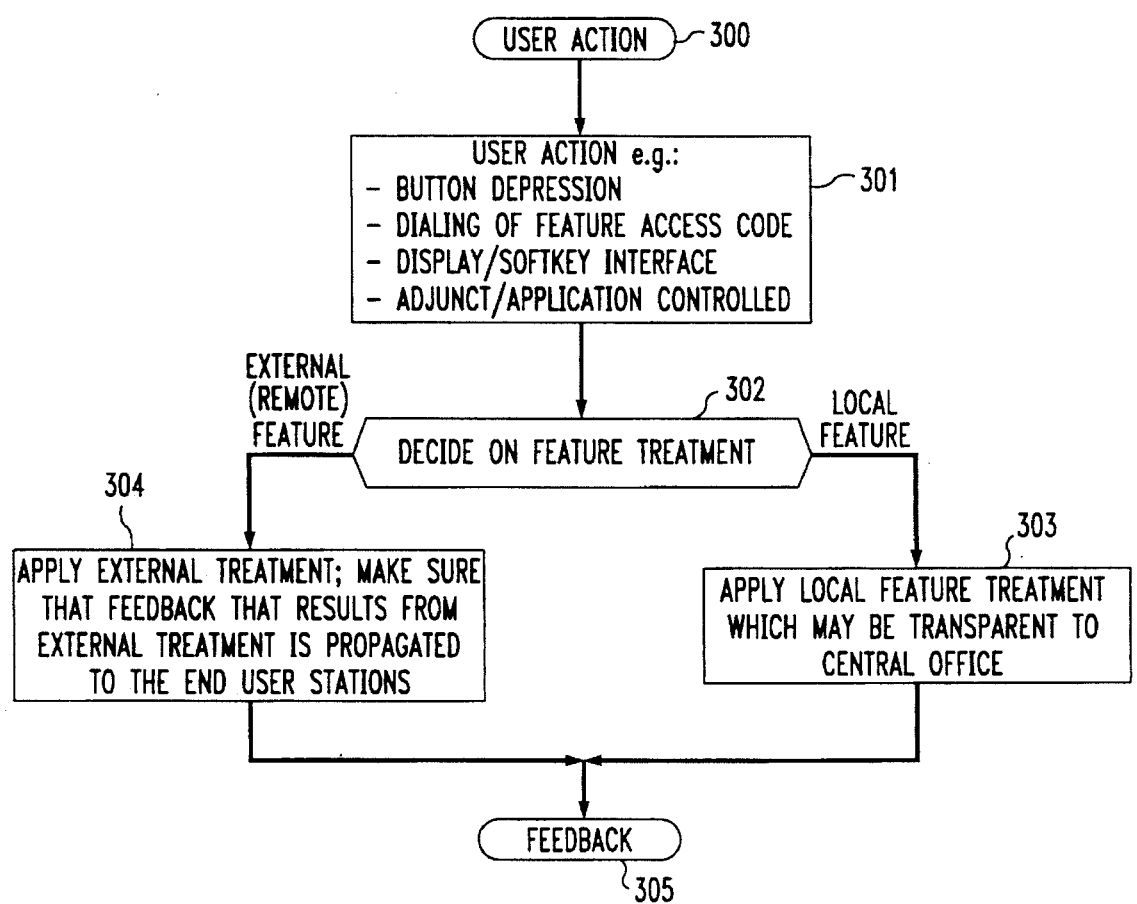

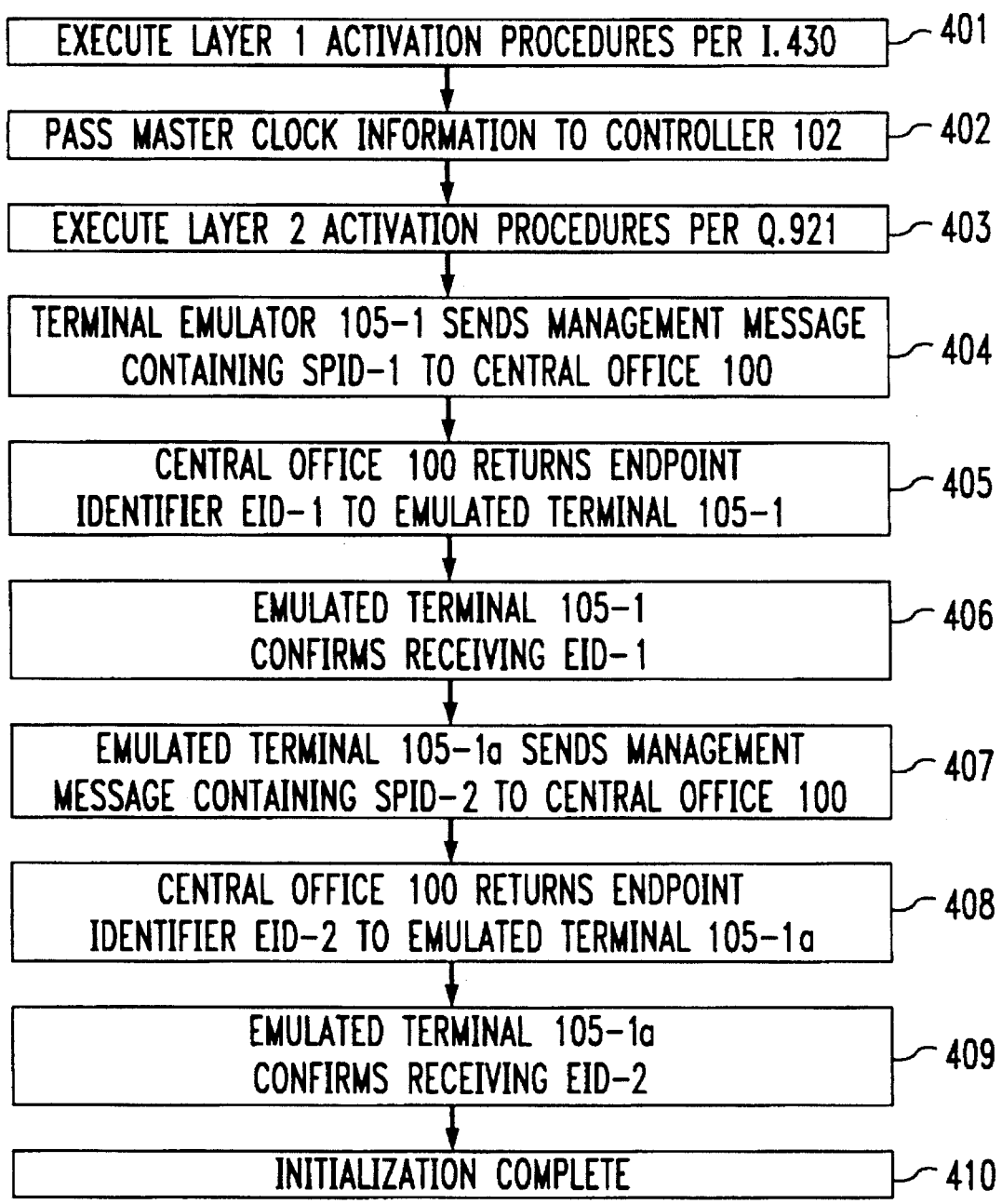

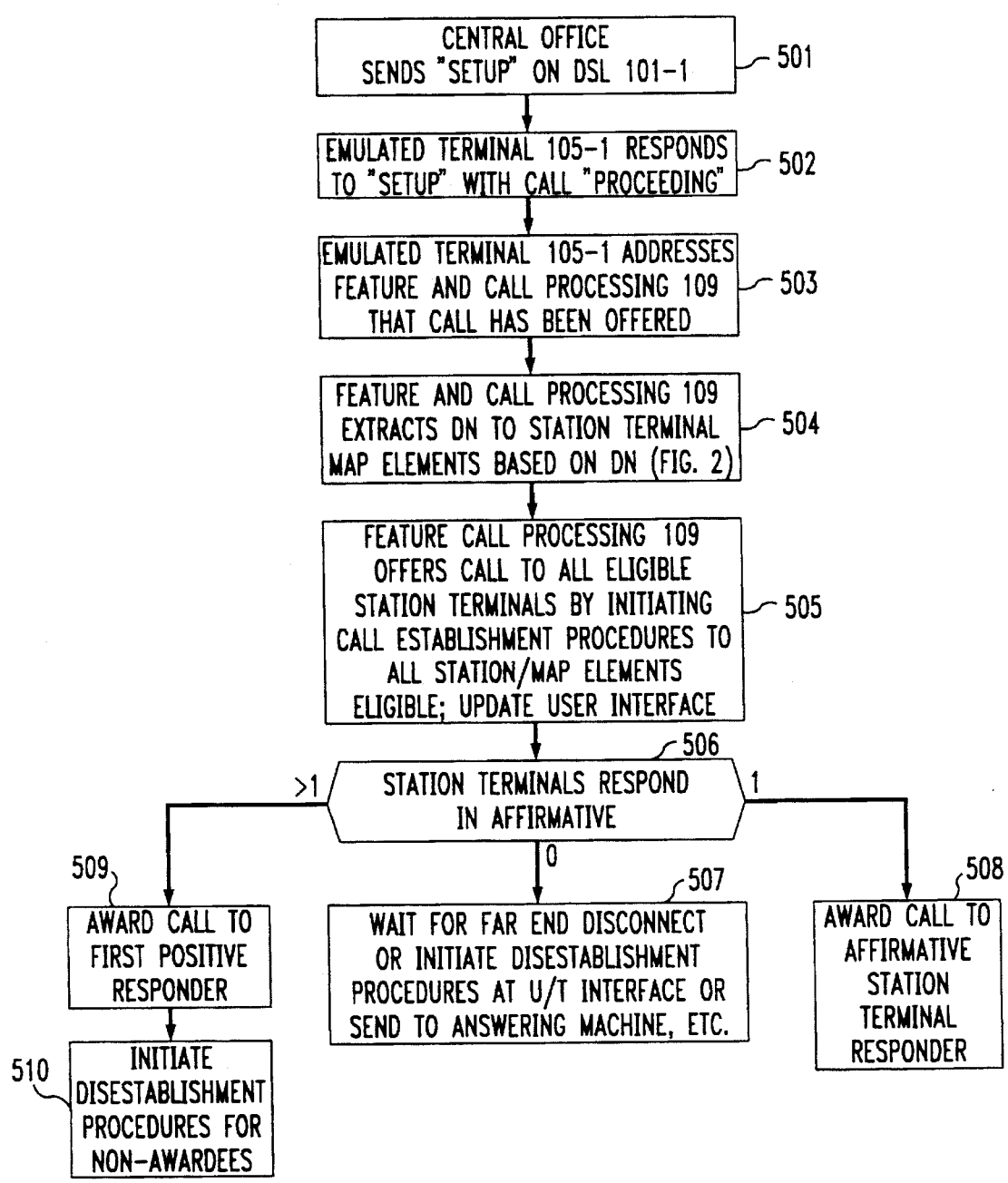

UPDATE USER INTERFACE

SYSTEM ORGINATED CALL

ISDN BASIC RATE INTERFACE CENTRAL OFFICE STATION TERMINAL EMULATOR FOR CUSTOMER PREMISES EQUIPMENT

CROSS REFERENCE TO RELATED APPLICATION

U.S. patent application Ser. No. 08/253,461 was filed concurrently herewith.

TECHNICAL FIELD

This invention relates to communication equipment and, more particularly, to equipment for interfacing to an ISDN digital subscriber line (DSL).

BACKGROUND OF THE INVENTION

Central offices are known to provide Centrex and/or advanced supplementary services. Many of these Centrex central offices are now being, or have been converted to support digital subscriber lines which provide an ISDN basic rate interface (BRI) capability.

The BRI is designed to provide two channels (2B) for providing channel service capable of transmitting either voice or data and one control channel (D) over a digital subscriber line (DSL). The BRI interface in present 5ESS® Centrex central office switches is arranged to provide for each terminal connected to the DSL a maximum of one B channel for voice service. That is, two voice channels to the same central office (CO) station terminal is not a supported service. Presently, however, some or many user station terminals exist which have two voice channels and, consequently, cannot operate effectively over the BRI interface that exists in present 5ESS Centrex central offices. Additionally, the user station terminals were required to be ISDN BRI compatible. Numerous existing PBX/KEY type telephone systems employ other than ISDN BRI compatible telephone terminal apparatus. A problem exists as to how to interface PBX/KEY type telephone systems to the BRI interface in the 5ESS Centrex central offices.

SUMMARY OF THE INVENTION

The problems and limitations associated with obtaining full channel service over the ISDN BRI interface are overcome by emulating at least one CO station terminal which provides access to a voice channel over a single DSL for user station terminals whether or not they are ISDN BRI compatible. To this end, an interface is provided for the DSL that emulates an ISDN BRI CO station terminal and acts like a facility to user station terminals.

More specifically, a plurality of CO station terminals are emulated on a single multi-point passive bus terminating the single DSL. During initialization, each of the emulated CO station terminals sends an identity to the CO switching office which presents the appearance that the software emulated CO station terminal is a physical CO station terminal. The emulated CO station terminals are configured such that CO features are accessible. Information from the emulated CO station terminals is mapped into existing system structures where such structures are available and compatible with the information from the emulated terminal. New structures have been created so that CO supplementary services can be invoked by the emulated CO station terminals.

A technical advantage of the invention is that by employing the emulated ISDN-BRI CO station terminals, non-ISDN BRI user station terminals can make use of advanced ISDN facilities. Another technical advantage is that one or more user station terminals can access the advanced ISDN facilities via any available DSL.

BRIEF DESCRIPTION OF THE DRAWINGS

FIG. 2 is a table illustrating a view into the controller's system database showing the data relationships being mapped from the DSL to the emulated terminals and vice versa;

FIG. 2A is a table illustrating a view into the controller's system database showing the data relationships being mapped from the station terminals to facility and feature service and vice versa;

FIG. 3 is a flow chart illustrating how a PBX/KEY-type telephone terminal user accesses local system features, and Centrex supplementary features;

FIG. 4 is a flow chart illustrating the initialization procedures executed by the emulated terminal;

FIG. 5 is a flow chart illustrating the procedures associated with offering an incoming call to the PBX/KEY-type telephone system via, the emulated terminals;

DETAILED DESCRIPTION

Figure 1:
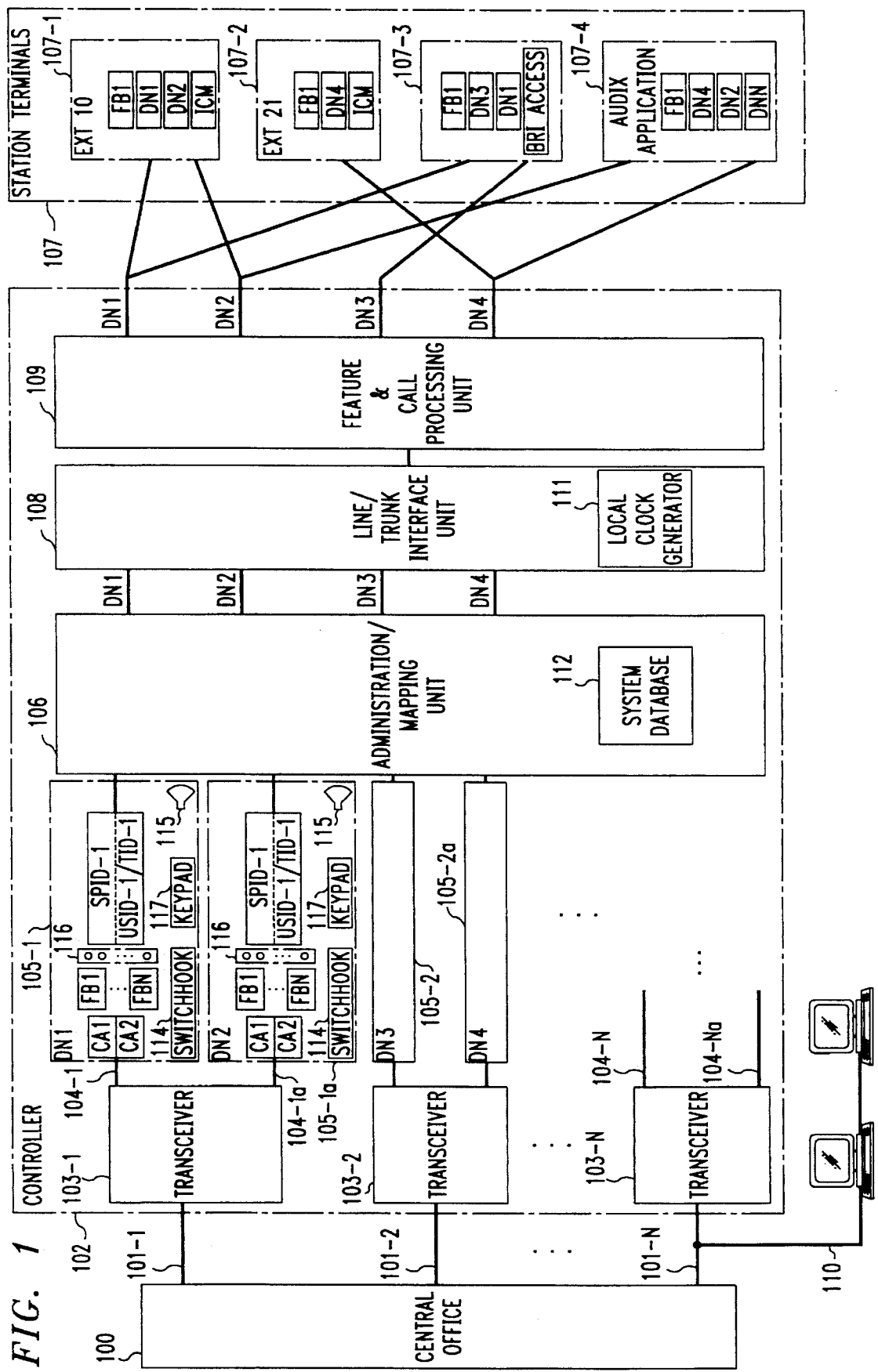
FIG. 1 shows in simplified block diagram form a system employing an embodiment of the invention.

FIG. 1 shows in simplified block diagram form a system arrangement employing an embodiment of the invention. Shown is central office 100 which is arranged to provide Centrex features and capabilities. However, it will be apparent that the invention may be employed in any CO having the modified ISDN-BRI whether or not Centrex services are also available. As indicated above, a 5ESS switch is employed in such Centrex central offices having the modified ISDN-BRI. Central Office 100 is connected via a plurality of digital subscriber lines 101-1 through 101-N to controller 102. Controller 102 includes a similar plurality of transceivers 103-1 to 103-N for interfacing DSLs 101-1 through 101-N. In this example, transceivers 103-1 and 103-2 are U interface point transceivers and transceiver 103-N is an S/T reference point transceiver. Such transceiver arrangements are well-known in the art. Each of transceivers 103 provides an electrical connection to a corresponding one of DSLs 101 and provides the mechanism to emulate a passive bus 104. Also shown are, software emulated CO station terminals 105-1 and 105-1a connected via passive bus connections 104-1 and 104-1a to transceiver 103-1. Note that bus 104 is a virtual passive bus and is not a physical collection of connections but functionally provides the stone result.

Each of emulated CO station terminals 105-1 and 105-1a includes virtual call appearances CA-1 and CA-2, and a service profile identifier (SPID). As will be described below, during system startup each of the emulated CO station terminals 105 transmits a SPID to central office 100 to identify each of emulated CO station terminals 105 as a legitimate termination on the passive bus 104. That is to say, each of emulated CO station terminals 105 appears as a physical ISDN BRI terminal to Centrex central office 100. Upon recognition of the SPID central office 100 will transmit to emulated CO station terminals 105 a user service identifier (USID) and associated terminal identifier (TID). Information from each of the emulated CO station terminals 105 is supplied to and from administration/mapping unit 106. Each of emulated CO station terminals 105 provides channel access service to the corresponding DSL 101 by conversion to the switch fabric internal standard. Additionally, supplementary service access initiated by activation of a feature button on one of user station terminals 107 is realized by mapping the user station terminal button to an assigned emulated CO station terminal virtual feature button. To this end, each of emulated CO station terminals 105 includes virtual feature buttons FB1 through FBN. Furthermore, each of emulated CO station terminals 105 includes virtual switchhook 114, alerter 115 virtual light emitting diodes (LEDs) 116 and virtual keypad 117. Virtual switchhook 114 is that which is associated with a traditional telephone instrument. In addition, signaling elements used to control an alerting device, typically included in a physical station terminal are captured by each of emulated CO station terminals 105 via virtual alerter 115 and mapped to local system generated alerting patterns. Similarly, feedback from central office 100, such as feature indication information elements, is decoded and mapped to station terminal indications. It is noted that the virtual CA1, CA2, FB1 through FBN, switchhook 114 and keypad 117 operations are up-link to central office 100, while the virtual alerter 115 and LEDs 116 operations are down-link to user station terminals 107.

Moreover, each of the emulated CO station terminals 105 dynamically allocates functionality determined by the particular type of user station terminal 107 being supported. For example, an ISDN BRI station terminal sends bearer capabilities (BC), while a non-ISDN user station terminal does not transmit BC and the feature and call processing unit 109 fabricates the appropriate BC in known fashion and passes it to the corresponding one of emulated CO station terminals 105. Furthermore, each of emulated CO station terminals 105 provides access to a single directory number (DN) which appears to user station terminals 107 like other Central Office lines. Although each of emulated CO station terminals 105 are shown as supporting two (2) voice channels, it should be noted that they can support eight (8) channels, where the additional six (6) channels are packet channels. Thus, by employing the two emulated CO station terminals to terminate the corresponding DSL 101, two voice channels are obtained per DSL 101 instead of just one as in the past. That is, each of emulated CO station terminals 105 provides access to one B channel of channel service. Additionally, each of emulated CO station terminals 105 extracts call related and non-call related signaling from an incoming D channel signaling service and provides the extracted signaling information to controller 102. Each of emulated CO station terminals 105 also supplies outgoing call related and non-call related signaling information into an outgoing D channel.

It is noted that the signaling service is transported on the BRI D channel. The signaling service includes call control related information, call typing information and call related information. Examples of call control related information are call establishment and disestablishment messages. Call typing information is exemplified by the bearer capability and high layer compatibility and low layer compatibility information elements. Call related information is typified by calling party name and calling party number information elements. It is further noted that all of these signaling service elements are well known in the art.

The administration/mapping unit 106 includes access to system database 112 which is used to relate the emulated terminal channels and supplementary services to the PBX/KEY-type telephone system user station terminals 107. This is realized by employing line/trunk interface 108 and feature and call processing unit 109. Additionally, controller 102 recognizes non-ISDN dialing digits from user station terminals 107 and converts them into ISDN signaling elements presented by virtual keypad 117 in each of emulated CO station terminals 105.

Figure 9:
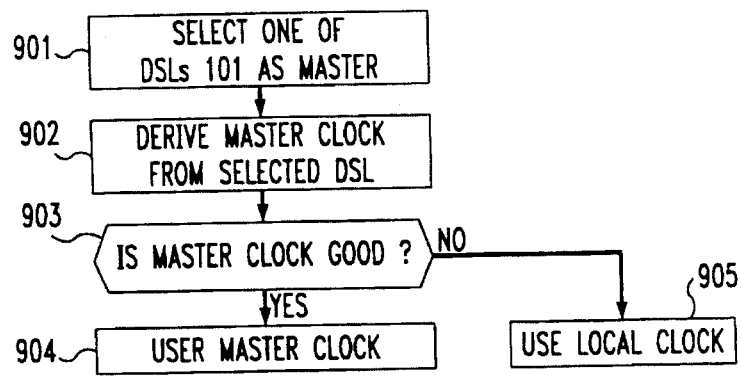
FIG. 9 is a flow chart illustrating the clock selection procedure.

Line/trunk interface 108 accesses the system database 112 and extracts therefrom the mapping between the individual ones of the system user station terminals 107 call appearances and the identity of the individual emulated CO station terminals 105 associated with the emulated terminal that manages the identified facility. Line/trunk interface 108 also includes local clock 111. Normally, the clock for the system is derived from a selected, i.e., a master one of DSLs 101, as shown in FIG. 9 steps 901 and 902. Step 903 of FIG. 9 tests to determine whether or not the derived master clock is good. If the test result is YES, the system uses the master clock as shown in 904. If the test result in step 903 is NO, the system selects the local clock from 111 (FIG. 1) as shown in step 905. Thus, the system can continue to operate locally in the presence of DSL failures.

Feature and call processing unit 109 is employed to discriminate between call appearances and feature button actuation of the PBX/KEY-type telephone system user station terminals 107.

System user station terminals 107 may include any number of different types of user terminals and application processors. For purposes of description only, shown are an existing multi-function analog terminal 107-1, a common analog terminal 107-2 (e.g., tip/ring type), an ISDN-BRI terminal 107-3 and an application processor 107-4 (e.g., an AUDIX® application). Thus, it is seen, that by employing the emulated CO station terminals 105, non-ISDN station terminals can access Centrex central office 100 via an advanced ISDN BRI interface.

Also note that when transceiver 103-N is an S/T transceiver, then controller 102 operates as a member terminal on a passive bus 110 connected to DSL 101-N. The S and T reference points are defined by the ISDN User-Network Interface Reference Configurations described in the ITU-T (previously "CCITT Recommendation") I.411 Standard, dated March 1993, pages 1–7 and the U interface point is defined in American National Standard for Telecommunications (ANSI) T1.601-1992 entitled "Integrated Services Digital Network (ISDN) Basic Access Interface for Use on Metallic Loops for Application on the Network Side of the NT (Layer 1 Specification)" and approved Feb. 21, 1992 by the American National Standards Institute, Inc.

Each of the emulated CO station terminals 105 employs administrative/mapping unit 106 to relate virtual access buttons and virtual feature buttons on the individual ones of user station terminals 107 of the PBX/KEY-type telephone system to Central Office channels and Central Office based supplementary services. To this end, the relationships of feature buttons and call appearance buttons of user station terminals 107 and virtual feature button and virtual call appearance buttons in emulated CO station terminals 105 are stored and used in mapping the station terminal buttons to the virtual buttons and the virtual buttons to station terminal buttons.

FIG. 2 is a graphical representation of a view into the general purpose system database structure employed in administration/mapping unit 106 operations. The relationships between the data entities are depicted in graphical format. There are entries in column 200 identifying DSLs 101 connected to this PBX/KEY-type telephone system. In this example, only the entries for DSL 101-1 and 102, are shown in column 200 along with their relationship to the corresponding emulated CO station terminals 105-1 and 105-1a and 105-2 and 105-2a, respectively, as shown in column 201. Each of emulated CO station terminals 105 has an administered directory number (DN) and SPID value, as shown in columns 202 and 203. The database also stores the USID/TID assignment for each of emulated CO station terminals 105 declared by the network during the initialization process, as shown in column 204 and to be described below. The emulated CO station terminals 105 are assigned internal facility IDs (FIDs), as shown in column 205. Each of emulated CO station terminals 105 has access to one bearer channel which is dynamically assigned during the call establishment procedure and is identified to the FID.

FIG. 2A depicts an alternate view into the system database. This database contains the map between specific user station terminals, each of which has a hardware station ID (SID). Column 206 shows SID-1 through SID-Y where Y is the number of possible user station terminals 107. Each user station terminal SID may have one or more buttons, exclusive of the keypad, which can be assigned either the attribute of a call appearance or a feature button. Column 207 shows the attributes of the buttons (BTNs) of the station terminal identified by SID-1. Buttons BTN-1 and BTN-2 each identifies a separate CO BRI channel identity. Button BTN-3 identifies a local feature identity, while BTN-X identifies a CO feature identity. In the situation where the button is to be used as a call appearance, a FID is assigned, as shown in column 208. In the situation where a button is to be assigned as a feature button, the attributes for either a local or remote feature treatment, i.e., supplementary services, are designated, as also shown in column 208.

The data in FIG. 2 would be used as follows. In the event of an incoming call, controller 102 determines that a call is being offered on a particular one of DSLs 101 to an associated one of emulated CO station terminals 105. This is declared by Central Office 100 through inclusion of the USID/TID in the call SETUP message, designating the intended recipient DN for the incoming call. Controller 102 then extracts the FID associated with this particular DSL-USID/TID, and looks up all user station terminals 107 that are eligible to receive the incoming call. Specifically, all of the user station terminals 107 which are assigned that particular FID are identified, and the call appearance on each of the identified user station terminals 107 to which the call is to be offered is identified. Controller 102 then invokes common call offering procedures directed to the appropriate CA on all the user station terminals 107 designated by the FID.

In the event of an outgoing call, a procedure similar to that for the incoming call is effected. When a user initiates a call, a call appearance is selected, either by the user depressing a button on a particular one of user station terminals 107, or by application of a so-called "line preference treatment". Once the CA is selected, controller 102 extracts the corresponding FID, as shown in FIG. 2A by looking up the SID and CA of the one of user station terminals 107 that originated the outgoing call. Once the FID is determined, the identity of the appropriate one of emulated CO station terminals 105 is ascertained.

Although not shown in FIGS. 2 or 2A, the system database stores the station terminal type information for all of user station terminals, 107. Such station terminal type information is supplied to controller 102 (FIG. 1) either by administration or by the individual ones of user station terminals 107 during system startup procedures. Consequently, controller 102 may access this information to assist in supplying mandatory BRI information for outgoing calls and to evaluate the mandatory BRI information for incoming calls, such as bearer capabilities. Additionally, the interworking between the emulated CO station terminals 105 and user station terminals 107 is such that if a user station terminal 107 uses a digital signal, e.g., PCM, it is propagated transparently through controller 102. Such interworking of signals to and from DSLs 101 and from and to, respectively, the signaling services, channel services and supplementary services to be supplied to individual ones of station terminals 107 is effected by controller 102 and, therein, by feature and call processing unit 109. If a user station terminal 107 uses an analog signal, controller 102 will transform it to a digital signal if necessary. That is to say, controller 102 will perform the appropriate interworking among a number of digital signals, analog signals and the like as required.

Note that button assignments are mutually exclusive specifically, if a button is assigned to a feature, it may not be assigned as a call appearance.

FIG. 3 depicts in flow chart form the acquisition of a feature through the user terminal interface. User action is initiated via 300 and is typically the depression of a feature button or entry of a feature access code via the dial pad. Note that an alternative invocation mechanism for feature acquisition can be a stimulus applied by an adjunct application processor. Upon user action via 301 indicating a request for a feature treatment, as determined in 301 the feature access code or button map element is analyzed via 302 to determine if the feature treatment is to be applied locally or externally. Note that in the case of a local feature treatment, the system controller 102 executes via 303 the preprogrammed treatment. Such programs are existing and well known. In the case of an external remote feature, the particular emulated CO station terminals 105 will transfer the appropriate message to the network from the controller 102 via 304 using the well-known Q.932 protocol COM XI-R 239-E, Study Group XI-Report R 239, dated June, 1992, entitled "Generic Procedures For The Control of ISDN Supplementary Services",. In addition, feedback from Central Office 100 indicating the status of the external feature treatment is delivered via 305 to the requesting user. Such feedback may include, but is not limited to, call illumination feedback, a display, a tone, or the like.

FIG. 4 depicts an initialization sequence executed by the system controller 102. Upon connection of the system controller 102 to the Central Office 100 the layer 1 activation procedures, as defined in I.430 COM XVIII-R 119-E (Study Group XVIII—Report R 119) dated July 1992 entitled "Recommendations of the I.430-Series Submitted for Approval at the Xth CCITT Plenary Assembly" are executed via 401. Upon successful execution of the activation procedures, layer 2 is notified and begins execution of standard datalink layer activation procedures via 403, as defined in Revised Recommendation Q.921 COM XI-R 205-E (Study Group XI—Report R 205) dated June 1992 entitled "ISDN User-Network Interface—Data Link Layer Specification". After activating both layers 1 and 2, the layer 3 initialization sequence begins and emulated CO station terminal 105-1 sends via 404 a management message to the network containing SPID-1 on DSL-101-1, for example. Note that the two initializations per DSL 101 can occur sequentially where each emulated CO station terminal 105 requests and completes the initialization procedure prior to any of the others of the emulated CO station terminals 105 doing so. Alternatively, the initializations for a number of emulated CO station terminals 105 can occur simultaneously. Upon receipt of this SPID-1 message, central office 100 accesses its internal database to validate SPID-1 on DSL 101-1. Having successfully validated this SPID-1 on this DSL 101-1 the, central office 100 returns via 405 an endpoint identifier (EID) to the originating emulated CO station terminal 105-1 where the endpoint identifier contains the USID-1/TID-1. i.e., EID-1=USID-1/TID-1. Emulated CO station terminal 105-1 confirms receiving the initialization response by returning the EID-1 to central office 100. This completes the initialization process for emulated CO station terminal 105-1. In order to initialize, the second emulated CO station terminal 105-1a on virtual passive bus 104-1a, emulated CO station terminal 105-1a a commences execution of the initialization procedures described above sending SPID-2 via 407 to central office 100 and receiving via 408 endpoint identifier 2 (EID-2). Emulated CO station terminal 105-1a confirms receiving the initialization response by returning EID-2 via 409 to central office 100 and it stores EID-2 for future reference. The initialization procedure is completed by 409 and central office 100 now believes that it has two direct attached physical ISDN BRI terminals operating in passive bus mode each with a unique identifier USID-1/TID-1, and USID-2/TID-2 respectively. It is noted that the initialization procedure, as described above, is the same for the emulated CO station terminals 105 associated with each of DSLs 101.

FIG. 5 depicts in flow chart form an incoming call being offered by the Central Office 100 to one or more of the PBX/KEY-type telephone system user station terminals 107, depending on the administrative configuration. The central office 100 initiates call establishment procedures by transferring a 5ESS switch call "SETUP" message via 501 over the user network interface on DSL-101-1 directed to USID-1/TID-1. Such call SETUP messages are known in the art and described in the "5ESS Switch Custom ISDN Basic Rate Interface Specification 5E8 Software Release" AT&T 235-900-343, dated December 1991. Emulated CO station terminal 105-1 analyzes via 502 the SETUP message and determines that its stored value USID-1/TID-1 equates to the value specified in the SETUP message and responds to the SETUP with a call proceeding message. Note that emulated CO station terminal 105-1a, a co-inhabitant of the passive bus, does not respond to this SETUP message since its USID/TID value is unequal to that specified in the call establishment attempt. Emulated CO station terminal 105-1 notifies feature and call processing module 109 that a call has been offered on DSL-101-1 to emulated CO station terminal 105-1. The feature and call processor module 109 accesses via 504 the system database and extracts the directory number (DN) to station map data elements using the directory number as a key. For each user station terminal 107 eligible to receive this call, a light emitting diode (LED) associated with a call appearance button cell is typically assigned to represent the call appearance. The identifier of this LED and associated button cell is extracted and the call is offered via 505 to all user station terminals 107 that are eligible to receive this call as determined by the administrative database. Then, call establishment procedures are initiated to offer the call to all eligible user station terminals 107. This call offering may include activation of ones of an alerting device, a call illumination, display a message or other means on the eligible ones of user station terminals 107 for notifying them of the call's arrival after the call has been offered to the one or more user station terminals 107 eligible to receive it. Then, the user interface is updated as shown in FIG. 6.

Figure 6:
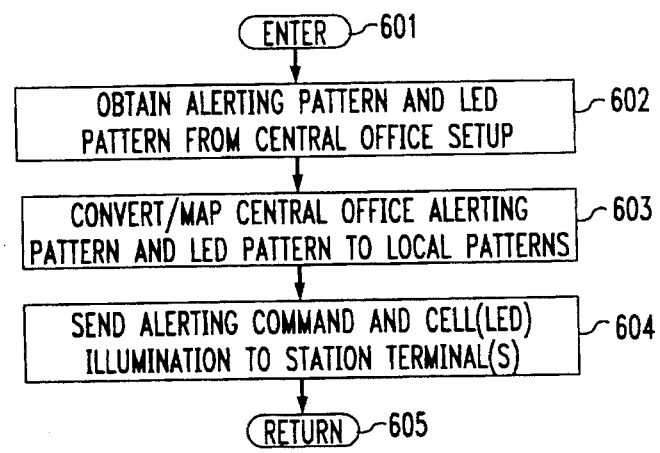
FIG. 6 is a flow chart of an update user interface routine employed in the flow chart of FIG. 5.

FIG. 6 is a flow chart illustrating the update user interface procedure used in step 505 of FIG. 5. The routine is entered via step 601. Thereafter, step 602 obtains from the central office setup message a call alerting pattern and the LED illumination pattern for a corresponding user station terminal LED/button. Then, step 603 converts/maps the obtained central office alerting pattern and LED pattern to local system patterns. Step 604 causes a local alerting command and cell (LED) illumination indication to appropriate of user station terminals 107. Thereafter control is returned to step 506 (FIG. 5). The above example exemplifies a typical user interface update. However, it should be noted that other call related information supplied from central office 100, such as "display and calling party number information can be likewise passed through, processed or discarded. For example, controller 102 can formulate a local cell illumination message or pass through the central office illumination message, i.e., LED pattern or discard it. Similarly, controller 102 can also pass through the central office alerting pattern, map it to some local alerting pattern or discard it. Additionally, a predetermined alerting pattern may be used for all incoming calls, which has been prescribed by a system administrator or system user.

Returning to FIG. 5, the next step depends on how many of eligible user terminal stations 107 respond via 506 in the affirmative to the call offer. If none of user station terminals 107 respond via 506 in the affirmative, emulated CO station terminal 105-1 waits for a far end disconnect or a system timer for emulated terminal 105-1 expires and emulated CO station terminal 105-1 will initiate via 507 call disestablishment procedures, or transfer the call to an answering machine or forward the call to an alternative number. In the event that none of user station terminals 107 respond and the central office 100 timer times out first, central office 100 will initiate the call disestablishment procedures. In the case where one of user station terminals 107 responds in the affirmative to the call offer, then the system awards via 508 the call to the respondee, and emulated CO station terminal 105-1 completes the call establishment procedures and cuts through the bearer channel to the user station terminal 107. In the case where more than one of user station terminals 107 responds in the affirmative to the call offering attempt, then the call is awarded via 509 to the first positive respondee and disestablishment procedures are initiated via 510 for all other terminals that had been offered the call.

Figure 7:
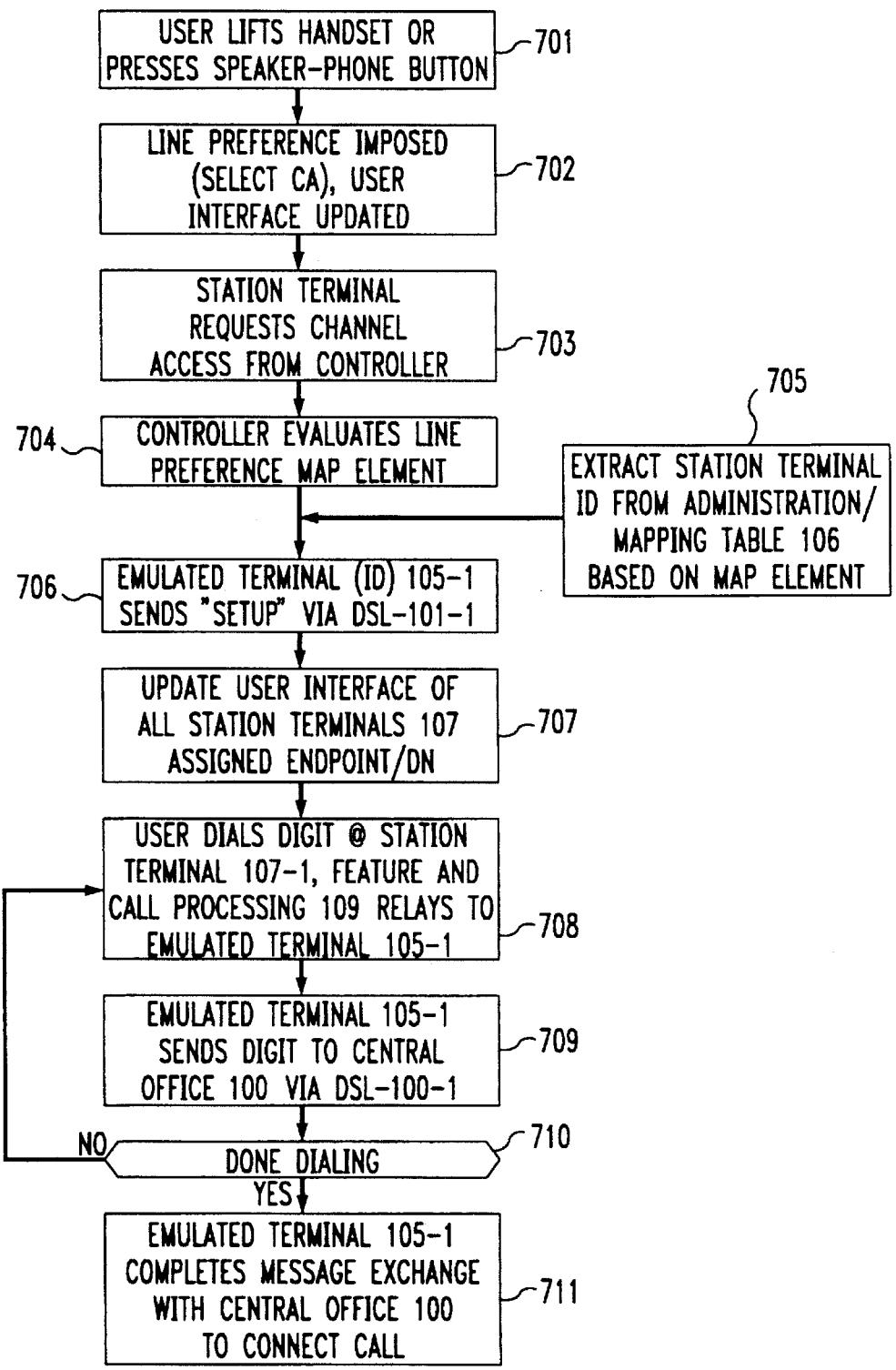
FIG. 7 is a flow chart illustrating the procedures associated with placing an outgoing call from the PBX/KEY-type telephone system station terminals via the emulated terminals.

FIG. 7 illustrates in flow chart format placing an outgoing call from any one of user station terminals 107. The outgoing call attempt begins with the user requesting via 701 outgoing channel service typically by lifting the handset, pressing a speakerphone button, etc. Standard line preference operations are executed via 702–704, e.g., selecting the call appearance, and the user interface is updated as needed. The system controller 102 will extract the one of emulated CO station terminals 105, e.g., 105-1, identifier associated with the currently active call appearance via 705 from the administration and mapping table (FIG. 2) based on the active call appearance map element. Having identified the emulated CO station terminals 105-1 assigned to that station/call appearance, the emulated terminal 105-1 is notified of a call setup request and sends via 706 a SETUP message via DSL-101-1. The SETUP message is well known and includes the BRI Bearer Capabilities Information Element. The system updates via 707 the user interface of all station terminals 107 administered for access to that emulator's channel service, as described above regarding FIG. 6, and updates the user interface to show busy. Meanwhile, the user dials via 708 the digits of the destination target phone number, such digits being relayed to the emulated CO station terminals 105-1 via the feature and call processing module. Emulated CO station terminal 105-1, in turn, relays via 709 those dial digits to Central Office 100 over DSL-101-1 employing the well-known Q.93 1 signal elements. As the dialed digits are relayed to the Central Office 100, Central Office 100 executes digit analysis procedures and upon determining via 710 that a complete phone number has been dialed, Central Office 100 notifies emulated CO station terminal 105-1 that dialing is complete via the standard Q.93 1 message. Assuming the far-end answers the call, emulated CO station terminals 105-1 will complete via 711 the message exchange sequence with Central Office 100 to connect the call as specified in Q.931 noted above and the 5ESS ISDN-BRI specification. If the far end fails to answer the call, standard disestablishment procedures are applied and the appropriate message is exchanged between CO station terminal emulator controller 105-1 and Central Office 100, thus terminating the call placement attempt.

Figure 8:
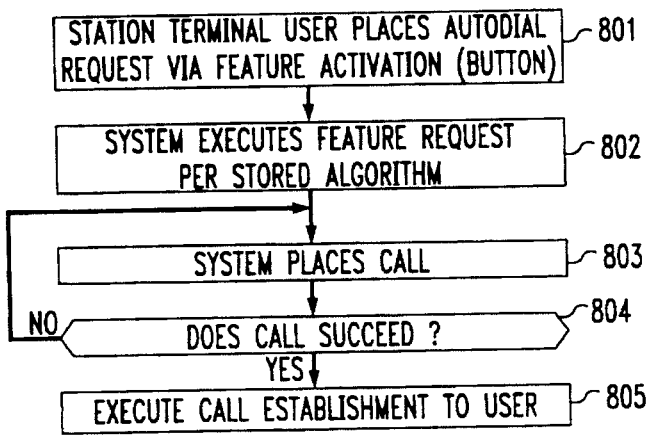
FIG. 8 is a flow chart illustrating the procedures associated with a PBX/KEY-type telephone system feature, in this example automatic redialing.

FIG. 8 is a flow chart illustrating the procedures in implementing a PBX/KEY-type telephone system feature, for example a system originated call. In this example, an autodial feature is illustrated. To this end, step 801 indicates that a user station terminal has requested the autodial feature by activating the associated feature button on the user station terminal. Step 802 causes controller 102 to execute the feature request. Step 803 causes controller 102 to place the desired call. Note that this call placement procedure is the same as illustrated above in FIG. 7, except that the system is placing the call and doing the dialing. Step 804 tests to determine if the call placing has succeeded. If the test result is NO, control is returned to step 803, and steps 803 and 804 are iterated until a YES result is obtained in step 804. It is noted that an option (not shown) is for the user of the user station terminal to cancel the request. This YES result indicates the call placement has succeeded and step 805 causes the execution of the call establishment procedures to the appropriate user station terminal 107. It should be noted that the system originated call does not necessarily have to be through cental office 100, it could also be to another user station terminal 107 connected to the PBX/KEY-type telephone system.

Although the invention has been described as interfacing user station terminals 107 to central office 100 via an ISDN BRI interface, it will be apparent that similar arrangements and techniques can be used with other advanced digital communications networks.

What is claimed:

1. Premises switching apparatus for providing a communications connection to a digital subscriber line (DSL) which is used to provide digital connectivity to a central office (CO) switch comprising, termination means for providing a physical point-to-point connection to said DSL, wherein communications over said DSL utilize an ISDN basic rate interface (BRI) protocol and wherein the communications connection is intended to be between the DSI, and a plurality of user station terminals, and means for controlling said termination means for emulating a plurality of BRI-compatible central office (CO) station terminals intended to be connected to said DSL so that user station terminals can access BRI services including central office supplementary services, said means for controlling including means for effecting a plurality of initialization procedures in said premises switching apparatus to identify at least one of said plurality of emulated CO station terminals as a user station terminal and for storing relationships of user station terminal feature buttons and user station terminal call appearance buttons to corresponding virtual feature buttons and virtual call appearance buttons in associated ones of the emulated CO station terminals.

2. Premises switching apparatus as defined in claim 1 wherein said BRI services further include signaling services.

3. Premises switching apparatus as defined in claim 2 wherein said BRI services further include channel services.

4. Premises switching apparatus as defined in claim 3 wherein said means for controlling further includes means for interworking signals to and from the DSL and from and to respectively the signaling services, channel services and supplementary services intended to be supplied to at least one user station terminal.

5. Premises switching apparatus as defined in claim 1 wherein said means for controlling further includes means for mapping user station terminal button depressions to virtual buttons and virtual buttons to user station terminal buttons, for mapping the user feedback from the emulated CO station terminal to the user station terminal and for mapping channel service call appearance information between the user station terminals and emulated CO station terminals.

6. Premises switching apparatus as defined in claim 1 wherein said controller means includes means for mapping the user station terminal buttons to means for accessing local system feature treatment and local system supplementary services.

\* \* \* \* \*